United States Patent [19]

Knör et al.

[11] 4,176,964

[45] Dec. 4, 1979

[54] DETERMINATION OF EXTREME DENSITY VALUES OF A TRANSPORTED STRIP OF PHOTOGRAPHIC ORIGINALS

[75] Inventors: Bernhard Knör; Bernd Payrhammer; Helmut Treiber, all of Munich, Fed. Rep. of Germany

[73] Assignee: AGFA-Gevaert, A.G., Leverkusen, Fed. Rep. of Germany

[21] Appl. No.: 830,867

[22] Filed: Sep. 6, 1977

[30] Foreign Application Priority Data

Sep. 8, 1976 [DE] Fed. Rep. of Germany ....... 2640442

[51] Int. Cl.$^2$ ............................................ G01N 21/30
[52] U.S. Cl. ................................. 356/444; 250/237 R; 250/571; 350/62
[58] Field of Search ............... 356/205, 206, 443, 444; 350/6.2, 274; 250/237 R, 571

[56] References Cited

U.S. PATENT DOCUMENTS

| | | | |
|---|---|---|---|
| 2,442,910 | 6/1944 | Thomson | 356/205 |
| 2,978,590 | 4/1961 | Shepard | 250/237 R |
| 3,772,525 | 11/1973 | Goodwin | 356/205 |
| 3,875,406 | 4/1975 | Holeman | 250/231 SE |
| 4,082,465 | 4/1978 | Bickl et al. | 356/203 |

*Primary Examiner*—John K. Corbin
*Assistant Examiner*—Bruce Y. Arnold
*Attorney, Agent, or Firm*—Michael J. Striker

[57] ABSTRACT

Light from a light source is transmitted through an original at a scanning station to a light detector. A rotating scanning disk located in the path of this light is provided with equiangularly spaced radial scanning slots. A light-blocking plate located between the light source and the scanning disk defines a scanning slot extending transverse to the transport direction of the original. Light passing through both the original and the transverse scanning slot is projected as a slot image onto the surface of the scanning disk. The radial slots and the transverse slot cooperate to define a scanning spot which sweeps across the original, and thereby performs one line-scan operation, as one radial slot sweeps across the slot image on the scanning disk. The angular span between adjoining radial slot is greater than that of the slot image so that, during intermediate intervals between successive line-scan operations, light transmitted through the original does not reach the light detector. During the intermediate time intervals, reference light from the light source is directed onto the light detector along a reference light path not passing through the original. An evaluating circuit receives both the signal produced by the light detector during a line-scan operation and the signal produced during the preceding or subsequent intermediate time interval, and in dependence upon the values of both signals produces a signal whose value indicates the density of the extreme-density scanned spot on the scanned original.

7 Claims, 3 Drawing Figures

DETERMINATION OF EXTREME DENSITY VALUES OF A TRANSPORTED STRIP OF PHOTOGRAPHIC ORIGINALS

CROSS-REFERENCES TO RELATED APPLICATIONS

The present invention is an improvement upon the system disclosed in commonly owned U.S. Pat. 4,082,465 issued Apr. 4, 1978 the disclosure of which is incorporated herein by reference.

BACKGROUND OF THE INVENTION

The present invention relates, in general, to problems encountered in scanning systems which ascertain the density of the extreme-density scanned spot on each of a succession of photographic originals transported through the scanning system.

Most especially, the present invention relates to problems encountered with the scanning system disclosed in the commonly owned U.S. patent identified above. In that system, a light source transmits light, through each original in a continuously transported strip of originals, to a light detector. A rotary scanning disk is located in the path of this light and provided with equiangularly spaced radial scanning slots. A light-blocking plate is located between the light source and the scanning disk and is provided with a scanning slot which extends transverse to the transport direction of the strip. Light which passes through both an original at the scanning station and also the transverse scanning slot is projected as a slot image onto the surface of the scanning disk. The radial slots and the transverse slot cooperate to define a scanning spot which sweeps across the original, and thereby performs one line-scan operation. In particular, one line-scan operation is performed as one radial scanning slot sweeps across the slot image projected onto the surface of the rotary scanning disk. The dimensions of the scanning slots and the spacing of the radial scanning slots are such that the scanning spot defined by them is of approximately constant configuration throughout the course of the line-scan operation. An evaluating circuit receives the signal produced by the light detector and determines the density of the extreme-density scanned spot on each scanned original, for example the density of the maximum-density scanned spot on each scanned original.

With this scanning system, and with other scanning systems employing a bright lamp or other such light source for generating scanning light, use must be made of a light source whose output light intensity is extremely constant, both short-term and long-term, and the evaluating circuitry of the scanning system must be adjusted for correspondence with the output light intensity of the light source. However, lamps of this type in general provide an output light intensity which is not sufficiently constant and reliable. This is attributable to simple aging of the lamps, power-supply variations, differences between one lamp and another when a lamp is replaced, and other such factors. The extent to which the output light intensity of the lamp may vary detracts from the accuracy of the extreme-density-value measurement. Certainly, when one lamp is replaced by another, the entire system must be recalibrated.

SUMMARY OF THE INVENTION

It is a general object of the invention to provide a scanning and evaluating system producing extreme-density-value measurements of high accuracy, despite the possibility of variation in the intensity of the scanning light employed.

It is a related object to provide a system which need not be recalibrated when one light source is replaced by another.

It is another object to provide a system in which the output light intensity of the light source need not be stabilized against the possibility of fluctuation or variation.

It is a further object to provide a scanning and evaluating system so designed that the value of the ultimate extreme-density-value measurement signal is mathematically independent of the output light intensity of the light source used to generate the scanning light.

These objects, and others which will become more understandable from the description of an exemplary embodiment, can be met, according to one concept of the invention, by transmitting reference light to the light-detecting means of the system, along a reference light path not passing through the photographic strip, during time intervals between successive line-scan operations. The evaluating circuitry receives both the signal produced by the light-detecting means during the actual line-scan operations and also the signal produced by the light-detecting means during time intervals intermediate successive line-scan operations. The evaluating circuitry, in dependence upon the values of both these signals, then produces the actual extreme-density-value measurement signal.

Using the inventive expedient, it becomes unnecessary to stabilize the light source against variations in output light intensity.

In the preferred embodiment of the invention, the extreme-density-value measurement signal is actually rendered mathematically independent of the output light intensity of the light source.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figures 1, 2:
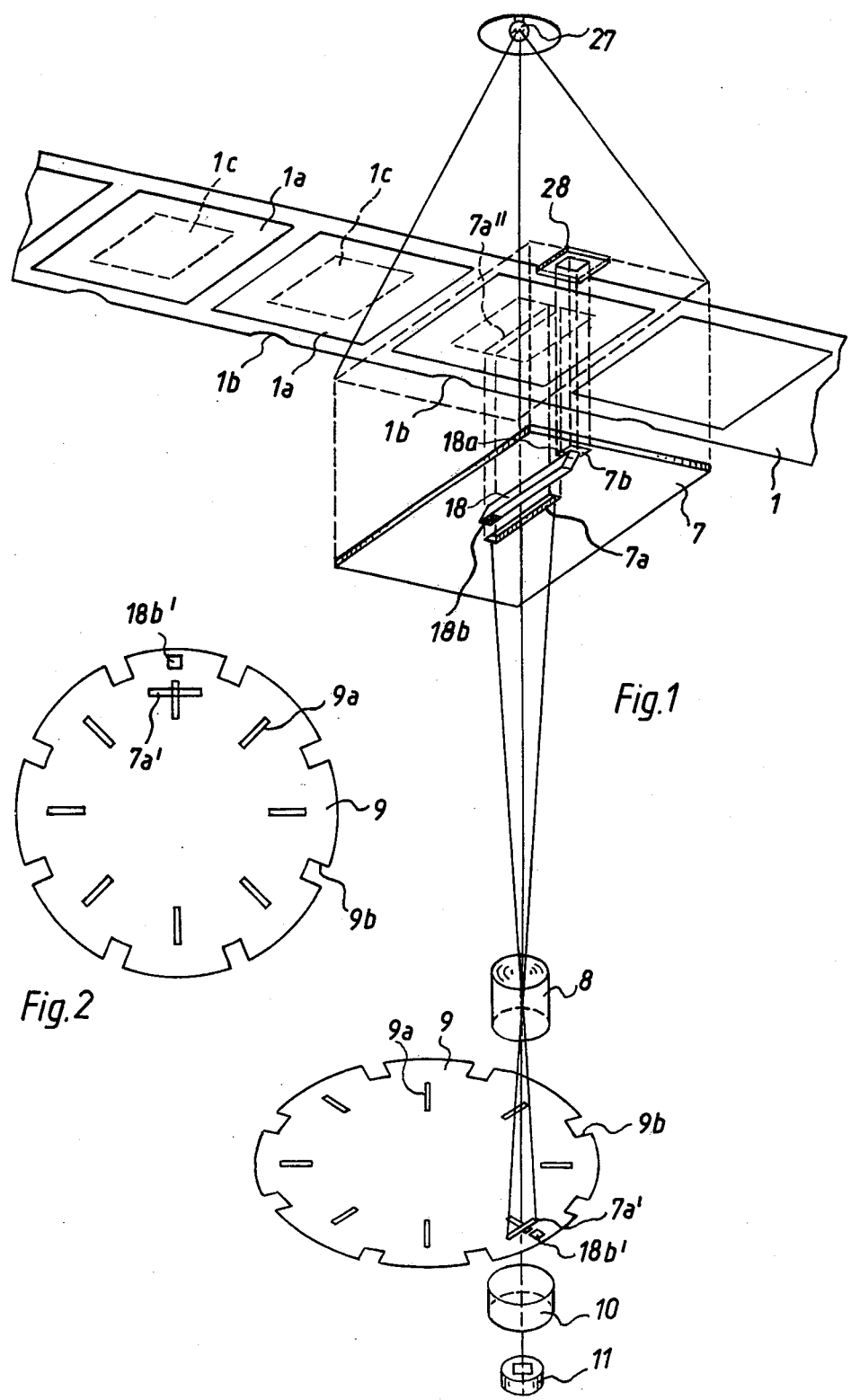
FIG. 1 is a quasi-perspective view of an exemplary embodiment of the inventive scanning and evaluating system.
FIG. 2 is a top view of the scanning disk employed in the exemplary embodiment of FIG. 1.

In the quasi-perspective illustration of FIG. 1 component 8 and the components beneath component 8 are seen from above, whereas components located above component 8 are seen from below.

A strip 1 of photographic originals 1*a* is transported along a predetermined path. Each original 1*a* is provided with a notch 1*b* at its lateral edge, midway between its leading and trailing ends. Numeral 1*c* denotes the central zone of each photographic original 1*a*. It is in particular the central zone 1*c* of each original 1*a* which is to be scanned when determining the exposure value of that original. In principle, the scanning of each central zone $1c$ should be performed on a pure point-by-point basis. However, as explained below, the cross-section of the scanning spot employed is finite and, in the illustrated embodiment, generally rectangular.

The strip 1 is transported over a guide plate 7. For the sake of clarity, the guide plate 7 is shown spaced from the bottom side of the strip 1; in actuality, the guide plate 7 is located directly beneath the strip, as indicated in broken lines in FIG. 1. In the region of the guide plate 7 corresponding to the central zones $1c$ of the originals $1a$, the plate 7 is provided with a slot $7a$ which extends transverse to the strip transport direction. The length of slot $7a$ corresponds exactly to the breadth of the central zones $1c$. The breadth of slot $7a$ corresponds to the length (measured in the transport direction) of the generally rectangular scanning spot employed.

A light source 27 located above the upper side of the strip 1 illuminates the strip. An objective 8 projects onto a rotating disk 9 an image $7a'$ of the transversely extending strip $7a''$ of an original $1a$ unblocked by the scanning slot $7a$. Rotating disk 9 is provided with a plurality of equiangularly distributed radially extending slots $9a$. The distance between adjoining radial slots $9a$ is greater than the length of the image $7a'$ projected onto the disk 9; i.e., the light of the image $7a'$ cannot pass through more than a single one of the radial slots $9a$ at any given time. Located beneath the rotating disk 9 is a further objective 10 which projects image light transmitted through the radial slots $9a$ onto a light detector 11.

The rotary speed of disk 9 is so selected relative to the transport speed of the continuously (i.e., non-intermittently) transported strip 1 that, during the time required for disk 9 to turn through an angle equal to that between adjoining radial slots $9a$, the strip 1 is transported a distance at most equal to the breadth of scanning slot $7a$, and preferably less than the breadth of slot $7a$. This assures that all portions of the central zone $1c$ of each original $1a$ are in fact scanned.

The guide plate $7a$ (which, it is to be remembered, is actually located directly beneath the film strip 1, as shown in broken lines) is provided with a further opening $7b$, located to the side of the transported strip of originals, i.e., so as not to be blocked by the strip 1. Mounted on the bottom side of guide plate 7 is a light-conducting bar 18 having inclined end faces. The upper surface of the right end of light-conducting bar 18 extends into the space directly beneath opening $7b$, and the portion of the upper surface of bar 18 located to receive light through opening $7b$ constitutes the entrance surface $18a$ of the light-conducting bar. Light received by light-conducting bar 18 at its entrance surface $18a$ emerges from the bar 18 at its exit surface $18b$, this being a portion of the bottom surface of bar 18 at the left end of the bar. The light emerging from exit surface $18b$ of light-conducting bar 18 is projected by objective 8 onto the surface of rotating disk 9 in the form of a light spot $18b'$. Rotating disk 9 is provided with a plurality of equiangularly distributed cut-outs $9b$. The light spot $18b'$ is projected onto the surface of disk 9 at a distance from the rotation axis thereof such as to be located in the path of movement of the cut-outs $9b$. Transmission of the light of light spot $18b'$ onto the light detector 11 is possible only when one of the cut-outs $9b$ moves into the region where the light spot $18b'$ is projected onto disk 9, and thus can occur only intermittently. Moreover, in terms of angular position, the cut-outs $9b$ are located intermediate adjoining radial slots $9a$. Accordingly, the cut-outs $9b$ can transmit the light of the light spot $18b'$ to the light detector 11 only at times when the radial slots $9a$ are not transmitting the light of the slot image $7a'$. I.e., transmission of the light of slot image $7a'$ alternates with transmission of the light of light spot $18b'$.

It is to be noted that the intensity of the light projected by light source 27 towards the original located at the scanning station and the intensity of the light projected towards opening $7b$ are the same.

Arranged directly above the opening $7b$ of the guide plate 7 is an adjustable light attenuator 28, preferably a gray-wedge filter. Light attenuator 28 is used to adjust the intensity of the light transmitted via opening $7b$ and light-conducting bar 18. When attenuator 28 is properly set, the output signal produced by light detector 11 upon receipt of light from the exit surface $18b$ of bar 18 is equal in value to the output signal produced upon receipt of light through the cooperating scanning slots $7a$, $9a$, for the case where no strip of originals is located above the guide plate 7.

Figure 3:
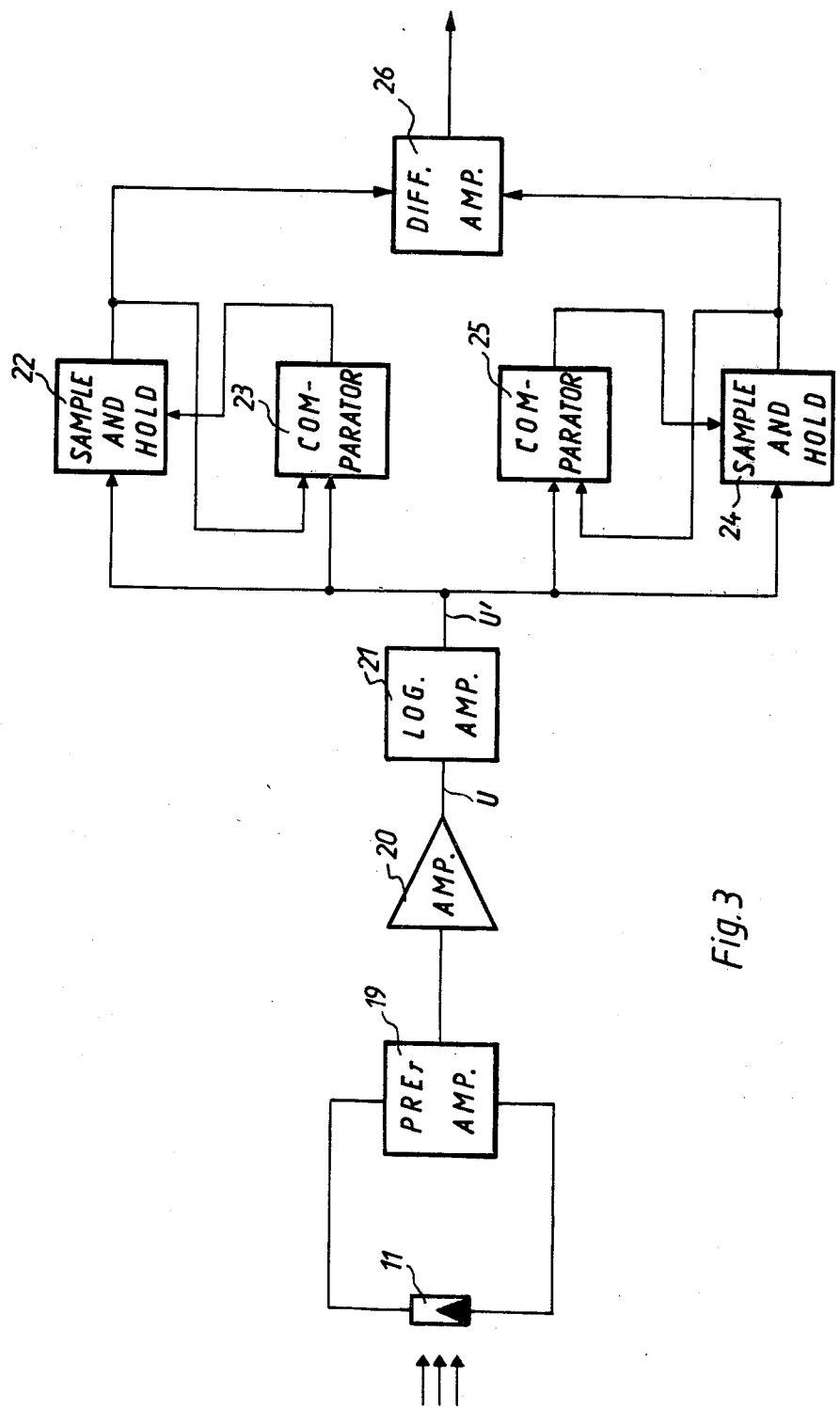
FIG. 3 depicts an exemplary evaluating circuit for use in the system.

FIG. 3 depicts, in block-diagram form, a circuit which evaluates the signals produced by the light detector 11.

Light detector 11 produces an output signal proportional to the intensity of received light. This signal is applied, through a preamplifier 19, to a main amplifier 20, at the output of which is produced a light-dependent voltage U having a voltage level suitable for signal processing. Light-dependent voltage U is applied to the input of a logarithmic amplifier 21.

The output signal $U'$ of logarithmic amplifier 21 is simultaneously applied to two sample-and-hold amplifiers 22, 24 and also to two comparators 23, 25. Sample-and-hold amplifier 22, in cooperation with comparator 23, forms a minima-responsive circuit which serves to register the lowest value assumed by the output signal $U'$ of the logarithmic amplifier 21 during one scanning operation, i.e., during the scanning of one central zone $1c$ of one original $1a$. Sample-and-hold amplifier 24, in cooperation with comparator 25, forms a maxima-responsive circuit which serves to register the highest value assumed by the output signal $U'$ during one scanning operation. In particular, comparator 23 compares the instantaneous value of voltage $U'$ against the value registered by sample-and-hold circuit 22; whenever the instantaneous value of voltage $U'$ is lower than that registered by circuit 22, comparator 23 enables circuit 22 for registration of this lower value. Analogously, comparator 25 compares the instantaneous value of voltage $U'$ against the value registered by circuit 24; whenever the instantaneous value of voltage $U'$ is greater than that registered by circuit 24, comparator 25 enables circuit 24 for registration of this greater value.

The output signals of the two sample-and-hold amplifiers 22, 24 are applied to the inputs of a difference amplifier 26. The signal produced at the output of difference amplifier 26 at the end of each scanning operation is, for reasons explained below, indicative of the density of the highest-density scanned spot within the scanned central zone $1c$ of an original $1a$ being scanned.

The illustrated, exemplary embodiment operates as follows:

The objective 8 and the slot $7a$ of guide plate 7 serve to project onto the surface of rotating disk 9 an image $7a'$ of a transverse strip $7a''$ of the original being scanned. As disk 9 rotates, the portion of image $7a'$ falling upon the radial slot 9a is transmitted to the light detector 11. The intersection of the radial slot 9a with the slot image 7a' is generally rectangular; i.e., the radial slot 9a cooperates with the scanning slot 7a to form a generally rectangular scanning spot. The performance of one line-scan operation is constituted by the movement of one radial slot 9a across the length of the slot image 7a' once, i.e., serving to scan one transverse line of the central zone 1c of the original 1a being scanned. Actually, because the strip 1 is in continuous (non-intermittent) transport, the scan line defined on the central zone 1c will not be exactly perpendicular to the strip transport direction, but instead somewhat inclined relative to a perpendicular orientation. When one radial slot 9a reaches and then passes the end of the slot image 7a', one line-scan operation has been performed. The next line-scan operation commences when the next radial slot 9a reaches and begins to move across the slot image 7a'. As indicated earlier, the distance through which strip 1 is transported during the time required for disk 9 to turn through an angle equal to the angle between two adjoining radial slots 9a is at most equal to the breadth of the scanning slot 7a, and preferably smaller. Accordingly, successive transverse sections 7a'' of the original scanned during successive line-scan operations adjoin each other at least without an intermediate gap and may even positively overlap, so that no transverse lines of the central zone 1c are left unscanned. On the other hand, the length of the slot image 7a' is smaller than the distance between adjoining radial slots 9a, so that interruptions in the transmission of light from the original to the light detector 11 occur in between successive line-scan operations. However, between successive line-scan operations, a cut-out 9b unblocks the light path of light spot 18b' and causes the light passing through attenuator 28, opening 7b and light-conducting bar 18 to be directed onto the light detector 11. The signal produced by light detector 11 during these intermediate time intervals constitutes a reference signal. The angular relationships between the cut-outs 9b and the ends of the slot image 7a' are such that, during operation, there is, overall, no interruption in the transmission of light onto the light detector 11 (see especially FIG. 2). For example, if scanning were performed with no photographic strip 1 located at the scanning station, the output signal produced by light detector 11 would have an uninterruptedly constant value. The receipt of light by detector 11 from the original, when terminated at the end of a line-scan operation, is immediately followed (i.e., without interruption) by the receipt of light from the exit surface 18b of light-conducting bar 18.

The output current of light detector 11, which is proportional to the intensity of received light, is preamplified by preamplifier 19 and then amplified by main amplifier 20, to produce a light-dependent output voltage U of suitable voltage level for further signal processing. As already explained, adjustable light attenuator 28 is set to a value such that the light-dependent voltage U produced during receipt of light through a cut-out 9b is the same as for receipt of light through a scanning slot 9a, for the case where no photographic strip material is present at the scanning station. This value of the light-dependent voltage U constitutes its reference value, and is herein denoted as $U_o$. In other words, during the time intervals intermediate successive line-scan operations, the value of light-dependent voltage U is $U_o$.

In contrast, when the scanning spot is scanning a spot on the original having a density D, the value of the light-dependent output voltage U is given by the equation $$U = U_o \times 10^{-D}.$$

The value of the voltage U' produced at the output of logarithmic amplifier 21 is related to the value of the voltage U applied to its input in accordance with the following equation $$U' = -\log U.$$

Thus, during the time intervals intermediate successive line-scan operations, the output signal U' of logarithmic amplifier 21 will have a value $U_o'$, determined in accordance with the equation $$U_o' = -\log U_o.$$

In general, i.e., when the scanning spot is scanning a spot on the original having a density D, the value of output voltage U' will be determined in accordance with the equation $$U' = -\log U_o + D.$$

The difference between these latter two signals is accordingly $$(-\log U_o + D) - (-\log U_o) = D.$$

In other words, the difference between these two voltages is directly indicative of the density D of the scanned spot itself.

At the end of a complete scanning operation (i.e., the scanning of the complete central zone 1c of one original 1a), the output signal of one sample-and-hold circuit will be equal to $(-\log U_o)$, because this value constitutes one extreme of the values assumed by voltage U' during the complete scanning operation. Likewise, at the end of one scanning operation, the output signal of the other sample-and-hold circuit will be equal to $(-\log U + D)$, wherein D is the density of the maximum-density scanned spot of the scanned central zone 1c of the original 1a, because this value $(-\log U + D)$ constitutes the other extreme of the values assumed by voltage U' during the complete scanning operation. Accordingly, at the end of the complete scanning operation, the output signal of difference amplifier 26 will have the value D, and thus be directly indicative of the density of the maximum-density scanned spot of the scanned central zone 1c of the original 1a.

At the end of each complete scanning operation (i.e., when scanning of one original is completed and before the scanning of the next original commences), the two sample-and-hold amplifiers 22, 24 are automatically reset to register, for example, zero volts, in preparation for the next scanning operation. For example, each sample-and-hold amplifier may be a conventional diode-and-capacitor unit, in which case resetting of the sample-and-hold amplifier is performed by closing a capacitor-discharge switch connected across the capacitor of the unit. The resetting of the sample-and-hold circuits is preferably performed in response to detection of the notch 1b of the original 1a which has just been scanned, as the just-scanned original is leaving the scanning station, performed, for example, using a notch feeler or a photoelectric notch sensor. Of course, the output signal of difference amplifier 26 has a value containing the desired maximum-density information only upon completion of the scanning operation. Accordingly, to suppress the values of the output signal 26 assumed during the course of the scanning operation, one can use, for example, a gate connected to the output of difference amplifier 26, this gate being enabled for signal transmission only after completion of the scanning operation and before the sample-and-hold circuits are reset. This gate, likewise, could be enabled in synchronism with the detection of the notch 1b of an original 1a leaving the scanning station.

Most importantly, it is to be noted that the output signal of difference amplifier 26 after completion of the scanning operation has a value D which is mathematically independent of the intensity of the light from light source 27. In particular, the value D of the output signal after completion of the scanning operation is equal to the difference of two terms ($-\log U_o$) and ($-\log U+D$). The values of these two terms are identically dependent upon the intensity of the light from light source 27; i.e., the components of these two terms dependent upon light intensity are of identical value. Accordingly, when the difference between these two terms is formed, the components of the two terms dependent upon light intensity drop out, and are not mathematically present in the resultant remainder. Thus, variations in the intensity of the light furnished by light source 27, whether due to aging, power-supply fluctuations, or other causes, have no effect upon the maximum-density signal produced by the system.

In the exemplary embodiment, the reference light transmitted to the light detector during the intervals between successive line-scan operations could be transmitted by means other than shown, for example using a light-conducting element extending directly from the light source down to a level immediately above the location on disk 9 where the light spot 18b' is shown in FIG. 1.

It will be understood that each of the elements described above, or two or more together, may also find a useful application in other types of circuits and constructions differing from the types described above.

While the invention has been illustrated and described as embodied in a particular type of scanning system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an apparatus for determining the extreme density values of successive photographic originals in a strip of photographic originals continuously transported along a predetermined path through a scanning station, in combination, a light source at the scanning station operative for transmitting light through an original located at the scanning station; light-sensing means operative for receiving light transmitted through the original and generating an electrical signal indicative of the intensity of received light; a rotary scanning disk located in the path of light between the light source and the light-sensing means and provided with a plurality of equiangularly distributed radial scanning slots; light-blocking means located in the path of light intermediate the light source and the scanning disk and defining a transverse scanning slot extending transverse to the direction of strip transport; projecting means operative for receiving light transmitted through both the original at the scanning station and the transverse scanning slot and projecting a corresponding slot image onto the surface of the scanning disk, the radial and transverse scanning slots accordingly cooperating during rotation of the scanning disk to define a scanning spot which performs successive line-scan operations each constituted by the movement of one radial scanning slot across the slot image on the surface of the scanning disk, the angular span between adjoining radial scanning slots being greater than the angular span of the slot image projected onto the surface of the scanning disk, thereby establishing interruptions in the transmission of light through the original to the light-sensing means during intermediate time intervals between successive line-scan operations; means operative during the intermediate time intervals for directing onto the light-sensing means reference light from the light source along a reference light path not passing through the strip of originals; and evaluating circuit means receiving both the signal produced by the light-sensing means during the line-scan operations and the signal produced by the light-sensing means during the intermediate time intervals and operative in dependence upon the values of both signals for producing a signal whose value is indicative of the density of the extreme-density scanned spot on the scanned original.

2. In an apparatus as defined in claim 1, the scanning disk being provided with a plurality of cut-outs located in the sectors of the scanning disk intermediate the sectors occupied by the radial scanning slots, the cut-outs being located at radial distances from the center of the scanning disk such as not to transmit the light of the slot image projected onto the surface of the scanning disk.

3. In an apparatus as defined in claim 2, the cut-outs being notches provided at the periphery of the scanning disk.

4. In an apparatus as defined in claim 2, the means operative for directing reference light onto the light-sensing means comprising a light-conducting structure having an entrance surface oriented parallel to the general plane of the original being scanned and located to receive light from the light source not transmitted through the strip of originals and having an exit surface so located that light emerging from the exit surface is projected by the projecting means onto the zone of the scanning disk provided with the cut-outs.

5. In an apparatus as defined in claim 2, the angular sectors of the scanning disk occupied by the radial scanning slots and those occupied by the cut-outs being of such respective angular spans and so angularly located that during rotation of the scanning disk there is no interruption in the transmission of light by the scanning disk onto the light-sensing means.

6. In an apparatus as defined in claim 1, the means operative for directing reference light onto the surface of the scanning disk comprising light-attenuating means located in the reference light path, the reference light attenuation introduced by the light-attenuating means being such that the output signal produced by the light-sensing means during receipt by the latter of light transmitted through one of the cut-outs is equal in value to the signal produced by the light-sensing means during receipt by the latter of light transmitted through the cooperating scanning slots if no photographic strip were present in the light path between the light source and the scanning disk.

7. In an apparatus as defined in claim 1, the evaluating circuit means including a logarithmic-transfer-function circuit connected to receive the signals produced by the light-sensing means both during the line-scan operations and the intermediate time intervals and operative for producing output signals logarithmically related to the received signals, maximum-value-detecting means connected to receive the logarithmically related signals and operative during the scanning of a succession of originals for registering the maximum values assumed by the logarithmically related signals, minimum-value-detecting means connected to receive the logarithmically related signals and operative during the scanning of a succession of originals for registering the minimum values assumed by the logarithmically related signals, and means connected to the maximum- and minimum-value-detecting means and operative for producing a signal indicative of the density of the maximum-density scanned spot on each scanned original in dependence upon the values registered by the maximum- and minimum-value-detecting means.

* * * * *